Nov. 22, 1927.

U. A. WHITAKER

VARIABLE LOAD BRAKE

Filed Feb. 8, 1927

1,650,309

2 Sheets-Sheet 2

INVENTOR
UNCAS A. WHITAKER
BY Wm. M. Cady
ATTORNEY

Patented Nov. 22, 1927.

1,650,309

UNITED STATES PATENT OFFICE.

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed February 8, 1927. Serial No. 166,718.

This invention relates to variable load brake devices and more particularly to a variable load brake device adapted to function only when a car is loaded, the usual type of brake being adapted to control the car when empty and to act in conjunction with the variable load brake when the car is loaded.

The principal object of my invention is to provide a variable load brake of the above type, capable of being adapted to harmonious operation with the usual fluid pressure brake equipment, employed in railway service.

Figure 1:
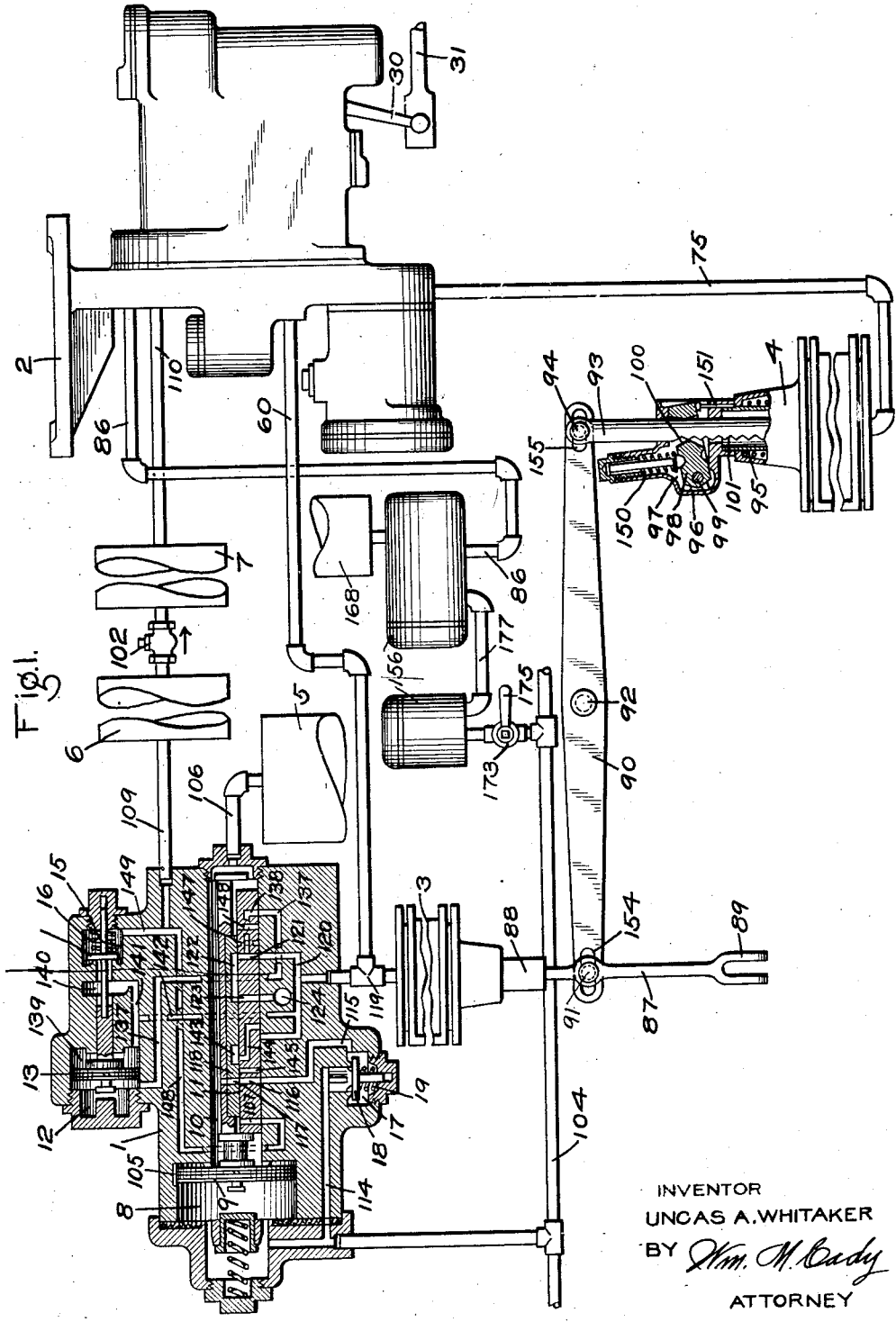
Figure 2:
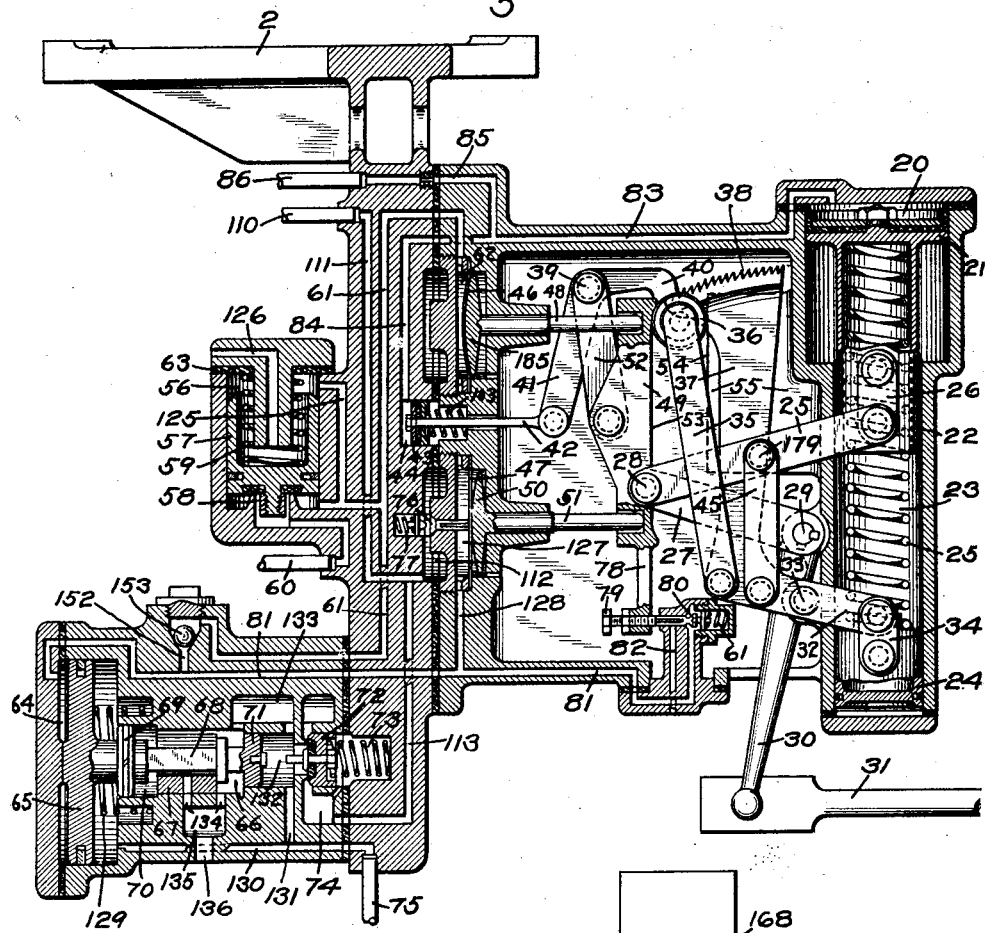
Figure 3:
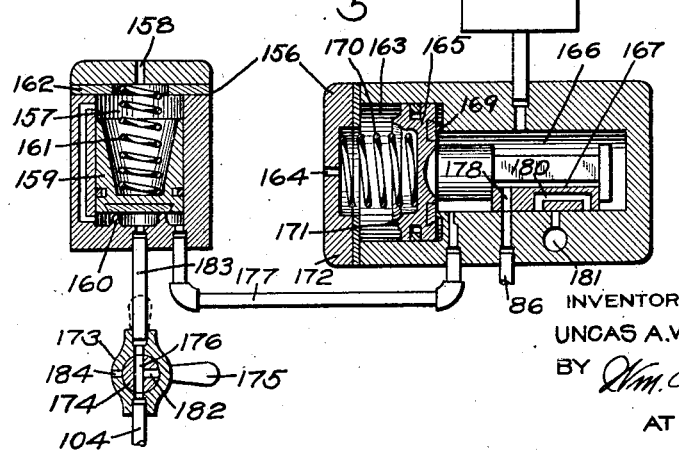

In the accompanying drawing; Fig. 1 is a diagrammatic view, partly in section, of a variable load, fluid pressure brake equipment embodying my invention; Fig. 2 a sectional view of the variable load controlling mechanism shown in outline in Fig. 1; and Fig. 3 a sectional view of the means for cutting the variable load regulating mechanism into and out of action.

According to the drawings, the fluid pressure brake equipment may comprise a triple valve device 1, a variable load valve device 2, a variable load regulating mechanism 156, an empty brake cylinder 3, a load brake cylinder 4, the usual auxiliary reservoir 5, supplementary reservoir 6, and a load reservoir 7.

The triple valve device 1 may comprise a casing having a piston chamber 8, containing a piston 9, and a valve chamber 10, containing a main slide valve 11, and an auxiliary slide valve 118, adapted to be operated by said piston. Said casing also has a piston chamber 12 containing a piston 13, adapted to operate a poppet valve 14, contained in chamber 15, the opening of said poppet valve being opposed by the pressure of a spring 16. Contained in a chamber 17 of said casing is a check valve 18, normally held closed by the pressure of a spring 19.

The variable load device 2 is, in general, similar in construction to the variable load device disclosed in the pending application of Thomas H. Thomas, Serial No. 120,939, filed July 7, 1926, and comprises a casing having a chamber 20 containing a piston 21 having a hollow piston stem 22, which slides in bore 23 of reduced diameter. In the bore 23 is disposed a dashpot piston 24, and interposed between said piston and the piston 21 is a coil spring 25, said spring extending through the interior of the hollow piston stem 22.

A lever 25 is connected to piston stem 22 by a link 26, and a lever 27 is pivotally connected to the free end of the lever 25 by means of a pin 28. The opposite end of lever 27 is secured to a rotatable pin 29 to which an arm 30 is also secured, said arm being pivotally connected to a rod 31, which in turn is pivotally connected to a rocker arm (not shown) carried by the car body, and said rocker arm is adapted to engage a member on the car truck (not shown), in the same manner as described more in detail in the previously mentioned pending application.

A lever 32, fulcrumed on a fixed pin 33, is connected at one end through a link 34 to the piston 24 and the opposite end of lever 32 is connected through a link 35 to a roller 36, secured at its free end. An arm 37, carried by the lever 32, is provided at its outer end with a toothed segment 38.

Fulcrumed on a pin 39 is a rocker arm having a pawl arm 40 provided with teeth adapted to engage the teeth of the segment 38, and an arm 41 connected to the stem 42 of a piston 43, contained in chamber 44. Lever 25 is also connected to lever 32 by a link 45.

Vertically disposed in the casing are flexible metal diaphragms 46 and 47, the diaphragm 46 being engaged on one side of a follower plate 185, having a stem 48, which engages in fulcrum plate 49, and the diaphragm 47 being engaged on one side by a follower plate 50 having a stem 51 also engaging the fulcrum plate 49.

The fulcrum plate 49 is pivotally supported by a link 52, pivotally mounted on the pin 39. Roller 36 is interposed between the face 53 of the plate 49 and the face 54 of a member 55 carried by the casing.

A hold back portion is provided, having a chamber 56 containing a valve piston 57, adapted in one position to be seated against a seat ring 58 by the pressure of a coil spring 59, so as to close communication between pipe 60 from the empty brake cylinder 3 and passage 61 connected with diaphragm chamber 62, and adapted in the opposite position to be seated against a gasket 63, in which position pipe 60 and passage 61 are connected.

A relay valve portion is also provided having a piston chamber 64, containing a piston 65 and a valve chamber 66 containing a slide valve 67, adapted to be operated by the piston stem 68. A small piston 69 is located in said piston stem, intermediate the piston 65 and slide valve 67 and is adapted to operate in the chamber 70, and a guide piston 71 is carried by the outer end of the piston stem. A poppet valve 72 is positioned to be operated by inward movement of the piston stem 68, said valve movement being opposed by the pressure of the coil spring 73. Said valve is adapted to control the flow of fluid under pressure from chamber 74 to pipe 75, connected to the load brake cylinder 4.

The stem of a valve 76 engages the face of the diaphragm 47, opposite the follower 50, said valve being subject to the pressure of a spring 77, tending to seat the valve.

The fulcrum plate 49 has an extension or lug 78 carrying an adjusting screw 79, adapted to engage the stem of a valve 80, which controls the venting of fluid under pressure from the piston chamber 64, through passage 81 to an atmospheric exhaust passage 82.

The piston chambers 20 and 44 are connected by passages 83 and 84, respectively, to passage 85, which is connected to pipe 86.

Interposed in a connection between pipe 86 and the brake pipe 104 is a valve mechanism 156 for controlling the operation of the variable load regulating mechanism, which may comprise a casing having a chamber 157 connected to the atmosphere through port 158 and containing a valve piston 159 subject to the pressure of a spring 161 tending to seat said valve piston against a seat ring 160, subject on the opposite side to brake pipe pressure, tending to shift the valve piston to a seat against a gasket 162. Said controlling valve mechanism 156 also comprises a casing having a piston chamber 163 connected to the atmosphere through port 164 and containing a piston 165 and a valve chamber 166 containing a slide valve 167, adapted to be operated by said piston. Connected to the valve chamber 166 is a reservoir 168. The piston 165 is subject to the pressure of a spring 170 tending to seat same against a seat ring 169. Fluid under pressure in valve chamber 166 tends to move said piston so as to seal against a gasket 172.

A cock 173 is provided in the brake pipe 104 having a plug valve 174, adapted to be operated by a handle 175.

The supply and release of fluid under pressure to and from the empty brake cylinder 3 is directly controlled by the triple valve device 1, while the supply and release of fluid under pressure to and from the load brake cylinder 4 is dependent upon the pressure in the empty brake cylinder 3, as supplied to the variable load valve device 2, by way of the pipe 60.

The empty cylinder 3 has the usual sliding push rod 87, contained in the hollow brake cylinder piston rod 88, and having at its outer end a yoke 89 adapted to be connected to a lever (not shown) of the usual brake rigging on the car. At an intermediate point, the push rod 87 is provided with an enlarged portion, and pivotally connected to the enlarged portion by the pin 91 is one end of a lever 90, the opening 154 in lever 90 for pin 91, being elongated to permit relative movement of the lever with respect to the rod 87. Said lever is fulcrumed on a pin 92 and the opposite end of said lever is connected to the outer end of the push rod 93 of the load brake cylinder 4, by a pin 94, the opening 155 in the lever, for pin 94, being elongated.

The load brake cylinder 4 has a hollow piston rod 95, and secured to the outer end of said piston rod is a latching device 96, which comprises a casing having a chamber 97, containing a locking pawl 98 pivotally mounted in said casing on a pin 99. Said locking pawl has a wedge shaped face 100 adapted to engage corresponding saw teeth 101 on the push rod 93, when the load brake cylinder piston moves to application position, but when the brakes are released and the latch device 96 engages the brake cylinder 4, the locking pawl 98 is maintained in the position shown in the drawings, in which the push rod 93 may freely move in or out of the hollow piston rod 95.

In operation, the fluid pressure brake system is charged in the usual manner, and fluid from the brake pipe 104 flows to piston chamber 8 of the triple valve device 1, and with the triple valve device in release position, fluid flows through the feed groove 105 into valve chamber 10 and thence through pipe 106 to the auxiliary reservoir 5. Fluid under pressure in valve chamber 10 is also supplied through port 107 in the slide valve 11, and passage 108 to the poppet valve chamber 15, and from said passage through pipe 109 to the supplemental reservoir 6. The load reservoir 7 is charged with fluid under pressure from the supplemental reservoir 6, through a check valve 102, and fluid from the load reservoir is then supplied through pipe 110 to the variable load mechanism 2, and thence through passage 111 to valve chamber 112, and from passage 111 through passage 113 to valve chamber 74 in the relay valve portion.

To augment the charging rate of said reservoirs, fluid under pressure also flows from the brake pipe 104 to valve chamber 10 through passage 114 and past the check valve 18 in the triple valve device 1, thence through passage 115, port 116 in the main slide valve 11 and port 117 in the auxiliary slide valve 118.

With the triple valve device 1 in release position, the empty brake cylinder 3 is connected to the atmosphere through pipe 119, passage 120, port 121 in the main slide valve 11, cavity 122 in the auxiliary slide valve 118, port 123 in the main slide valve and the atmospheric passage 124.

The empty brake cylinder 3 is connected by pipes 119 and 60 to the lower side of the valve piston 57 of the hold back portion of the variable load mechanism 2, and with no fluid pressure in the empty brake cylinder, the pressure of the spring 59 holds said valve piston seated in the position shown in the drawings, in which position the diaphragm chamber 62 is vented to the atmosphere through passages 61 and 125, spring chamber 56 and passage 126.

With diaphragm chamber 62 at atmospheric pressure, the fulcrum plate 49 assumes a position in which the valve 76 is seated and the release valve 80 is unseated, so that the application piston chamber 64 is vented to the atmosphere through passage 81, past the open valve 80 and through the atmospheric exhaust passage 82, and diaphragm chamber 127 being connected with passage 81 by way of passage 128, is also vented to the atmosphere.

With the application piston chamber 64 connected to the atmosphere, the pressure of spring 129 holds said piston and slide valve 67 in the positions shown in the drawings, in which the load cylinder 4 is vented to the atmosphere through pipe 75, passages 130 and 131, piston guide chamber 132, chamber 133, valve chamber 66, ports 134, chamber 135 and atmospheric exhaust passage 136.

With the triple valve device in release position, piston chamber 12 is vented to the atmosphere through passage 137, port 138 in the main slide valve 11, port 121, cavity 122 in the auxiliary slide valve 118, and through port 123 in the main slide valve 11 to the atmospheric exhaust port 124. The chamber 139 on the opposite side of said piston and chamber 140 are both connected to the atmosphere through passage 141, passage 142 and passage 120 from the brake cylinder 3, so that the piston 13 is balanced at atmospheric pressure, so that the supplemental reservoir pressure in chamber 15 holds the poppet valve 14 seated.

With the plug valve 174 in the position shown in the drawings, fluid under pressure from the brake pipe 104 is permitted to flow through port 176 to valve piston 159, and acts on the area within the seat ring 160. When the brake pipe pressure has been increased to some low degree, such as 10 pounds, the pressure of spring 161, acting on the valve piston 159, is overcome and said valve is shifted and sealed against the gasket 162. Fluid from the brake pipe then flows through pipe 177 to valve chamber 166 and reservoir 168 and thence through port 178 in the slide valve 167, and pipe 86 to the variable load mechanism, and thence through passages 85 and 83 to piston chamber 20, and from passage 85 through passage 84 to piston chamber 44. The resistance of spring 25 acting against piston 21 is such as compared with the resistance of spring 103 acting on piston 43, that fluid under pressure supplied to said pistons will first shift piston 21 before piston 43 is moved. When the piston 21 moves downwardly, since the lever 32 is locked against movement by the engagement of pawl arm 40 with the toothed segment 38 of the arm 37, the pin 179, which connects link 45 with said lever 25 acts as a fulcrum, and the movement of lever 25 about said fulcrum causes a movement of the rod 31 to the left, through movement of the arms 27 and 30. The movement of the arm 31 to the left causes the operation of a rocker arm (not shown) on the body to engage a member (not shown) on the car truck.

After the above movement of parts, the piston 43 is operated by fluid under pressure, against the pressure of the spring 103, so that the pawl arm 40 is actuated to disengage the teeth of the pawl from the teeth of the toothed segment 38.

The rod 31 is now free to move according to the load on the car. If the load is increased, the car body will move toward the car truck and thus cause the rod 31 to move to the right.

Piston 21 holds the adjacent end of the lever 25 against vertical movement, and the lever 32 being fulcrumed on the pin 33, the movement of the rod 31 toward the right causes a counter-clock-wise movement of the arm 27 and the lever 25. The link 45 is thus moved downwardly and causes a counter-clock-wise movement of lever 32 and the segment arm 37 about the fulcrum pin 33, so that the arm 35 is pulled downwardly, causing a downward movement of the fulcrum roller 36. Thus the position of the roller 36 is determined by the load on the car. If the car load is entirely removed, the parts will move in the reverse direction until the roller 36 assumes the position directly over the follower stem 48.

When the pressure in the brake pipe 104 has reached some predetermined higher degree than required to shift the valve piston 159 to its upper position, a pressure such as of 40 pounds, said pressure acting on the piston 165, inside the seal ring 169, shifts said piston against the pressure of spring 170, to the left until seat ring 171 seats on the gasket 172, in which position cavity 180 in the slide valve 167 connects pipe 86 to the atmospheric exhaust passage 181. Fluid under pressure is thus vented from pipe 86, which connects through passage 85 and passages 83 and 84 with the piston chambers 20 and 44, respectively. Since the spring 103 exerts a greater force than the spring 25, the release of fluid under pressure first permits the piston 43 in chamber 44, to be shifted by the spring 103, so that the pawl arm 40 is operated to cause the pawl teeth to engage the teeth 38 in the segment arm 37 in its adjusted position, and thus lock the arm 37 against movement while running, so as to ensure the position of the roller 36 remaining constant.

Piston 21 is then returned to its normal position, by the pressure of the spring 25, causing the rod 31 to be returned to its inactive right hand position. The piston 24 assumes a position in the bore 23 corresponding to the position of the roller 26.

With the car empty and the roller 36 positioned directly over the follower stem 48, when the brake pipe pressure is reduced in the usual manner to effect a service application of the brakes, the triple valve piston 9 and slide valves 11 and 118 are shifted to service position, in which fluid under pressure is supplied from the auxiliary reservoir 5 to empty brake cylinder 3, through port 147 and passage 120, and fluid under pressure is also vented from the brake pipe 104 to the empty brake cylinder 3 through passage 114, past check valve 18, through passage 115, port 145 in the main slide valve 11, cavity 143 in the auxiliary slide valve 118, passage 144, and passage 120, so that a quick service action is effected in the well known manner.

Fluid at the pressure in the empty brake cylinder 3 is supplied through pipe 60 to the hold back valve piston 57 and there acts on the exposed area inside of the seat ring 58. When the pressure therein reaches a predetermined degree, the valve piston 57 is shifted away from the seat ring 58, and is quickly moved upward and seals against the gasket 63. The fluid from the empty brake cylinder then flows through passage 61 to diaphragm chamber 62 and becomes effective on one side of the diaphragm 46. The roller 36 being directly in line with follower stem 48 and in engagement with the face 54 of the casing, the pressure in chamber 62 on diaphragm 46, and acting through the stem 48 on the fulcrum plate 49 will have no effect on the fulcrum plate. The variable load mechanism 2 therefore remains inactive whenever the brakes are applied on an empty car.

When fluid under pressure is supplied to the empty brake cylinder 3 to apply the brakes, the pressure of said fluid operates, in the usual manner, to shift the piston rod 88 and push rod 87 outwardly, and since the lever 90 is secured to said push rod, the lever 90 is rotated counter-clock-wise about the fulcrum 92 and causes the push rod 93 of the load brake cylinder 4 to be pulled partly out of the hollow piston rod 95. Thus, although the load cylinder does not operate to apply the brakes when a car is empty, the free movement of the push rod 93 prevents interference with the operation of the empty brake cylinder push rod 87.

To release the brakes, the pressure in the brake pipe 104 is increased in the usual manner, and when the pressure is increased to a point slightly higher than the pressure in the valve chamber 10 of the triple valve device, the piston 9 and slide valves 11 and 118 are moved to release position, in which the empty brake cylinder is connected to the atmosphere.

If it is desired to graduate the release of the brakes, the brake pipe pressure is increased a certain degree less than a full recharge. With the triple valve device in release position, the supplemental reservoir 6 is connected to valve chamber 10 by way of passage 108 and port 107 in the main slide valve 11, so that, since the pressure in said reservoir 6 is higher than the auxiliary reservoir pressure in valve chamber 10, after a service application of the brakes, the auxiliary reservoir is partially recharged by flow from the supplemental reservoir 6. If the brake pipe pressure is increased only a certain small degree, the flow of fluid from the supplemental reservoir will build the auxiliary reservoir to a pressure slightly higher than the brake pipe pressure in piston chamber 8, which will cause the piston 9 and auxiliary slide valve 118 to be shifted to graduated release lap position, in which said slide valve 118 laps the port 107 and prevents further flow of fluid from the supplemental reservoir 6 to the auxiliary reservoir 5, as well as cuts off communication between the empty brake cylinder 3 and the atmosphere through cavity 122, by lapping the brake cylinder exhaust port 121 in the main slide valve.

By increasing the brake pipe pressure in steps and then permitting the auxiliary reservoir to be recharged from the supplemental reservoir in corresponding steps, a graduated release of the brakes can be effected as desired.

To effect an emergency application of the brakes, the brake pipe pressure is suddenly reduced and the triple valve piston 9 and slide valves 11 and 118 are shifted to emergency position, in which the emergency port 148 in the main slide valve 11 registers with passage 120 and thereby permits the fluid in the valve chamber 11 and the auxiliary reservoir 5 to flow through passage 120 and pipe 119 to the brake cylinder 3. In emergency position, said slide valve 11 also uncovers passage 137 and permits auxiliary reservoir fluid to flow through passage 137 to piston chamber 12, which operates said piston to unseat the poppet valve 14, which permits fluid under pressure from the supplemental reservoir 6 to flow through pipe 109, passage 149, chamber 15, thence past the valve 14 into chamber 140, thence through passages 141, 142 and 120 to the pipe 119 and the empty brake cylinder 3. Thus the fluid under pressure in the supplemental reservoir is permitted to flow into the empty brake cylinder as well as that from the auxiliary reservoir, which together produce a high emergency brake cylinder pressure.

The brakes are released after an emergency application in the same manner as hereinbefore described.

The check valve 102 between the load reservoir 7 and the supplemental reservoir 6 prevents back flow when the supplemental reservoir pressure is reduced in releasing the brakes and when an emergency application is effected. This is very essential, since the supplemental and auxiliary reservoirs are always proportional to the size of the empty brake cylinder 3, and an increase in the size of said reservoirs would permit an increased brake cylinder pressure, which might result in damaging of cars, due to the sliding of wheels or increased buffing of cars, due to a greater than usual braking power.

When a service application of the brakes is effected on a loaded car, fluid under pressure from the empty brake cylinder 3 is supplied through pipe 60 to the exposed area of the hold back valve piston 57, inside of the seat ring 58. The relation between the exposed area of said valve piston inside of the seat ring 58 and the pressure of the coil spring 59 is such that the valve piston 57 will not be lifted from its seat until the pressure in the empty brake cylinder is sufficient to shift the empty brake cylinder piston and the push rod 89 out to a position in which the slack in the brake rigging has been taken up and the brake shoes are brought into engagement with the car wheels.

When the pressure of the fluid in the empty brake cylinder and acting on the valve piston 57 has been increased to the required degree, the valve piston is moved from its seat against the pressure of spring 59. As soon as the seal against the seat ring 58 is broken, the entire area of said valve piston is exposed to the pressure of the fluid supplied through pipe 60, so that said valve piston is quickly shifted to its upper position against the gasket 63.

With the valve piston 57 sealed against the gasket 63, fluid from the empty brake cylinder flows from pipe 60 to passage 61 and thence into diaphragm chamber 62, wherein the fluid pressure acts on the diaphragm 46 and the pressure is transmitted through the follower 185 and stem 48 to the fulcrum bar 49, which is then rotated clockwise about the fulcrum roller 36 with a consequent movement to the left of the opposite end of said bar.

The clockwise rotation of the fulcrum bar 49 first permits the release valve 80 to be seated by the pressure of the spring 61, thereby closing communication between passage 81 and the atmospheric passage 82. After closure of the release valve 80, further clockwise rotation of the fulcrum bar 49 causes a movement to the left of the follower stem 51 and follower 50 against the diaphragm 47 and unseats the valve 76.

With the valve 76 unseated, fluid under pressure in chamber 112, which is supplied thereto from the load reservoir 7 by way of pipe 110 and passage 111, flows past said valve into chamber 127 and thence through passages 128 and 81 to the relay valve piston chamber 64. When the pressure in diaphragm chamber 127 has been increased sufficiently to balance the pressure acting on the diaphragm 46, the fulcrum bar 49 is turned counter-clockwise about the roller 36 to a position in which the valve 76 is permitted to seat.

The pressure of the fluid supplied to piston chamber 64 shifts the application piston 65 to the right. The initial movement of said piston operates the slide valve 67 to close ports 134 in the slide valve seat. The guide piston 71 on the stem 68 then engages the stem of the poppet valve 72, and further movement of the piston 65 unseats said valve and permits fluid under pressure in chamber 74, supplied from the load reservoir 7, to flow into chamber 132 and thence through passages 131 and 130 to pipe 75 and to the load brake cylinder 4.

When the load brake cylinder piston (not shown) shifts the piston rod 95 and latch device casing 96 away from the brake cylinder casing, in applying the brakes, the pressure of the spring 150 against the locking pawl 98 turns the locking pawl clockwise about the fulcrum pin 99 until the wedge face 100 of the locking pawl engages with the teeth 101 in the push rod 93, so that further outward movement of the brake cylinder piston causes an outward thrust on the push rod 93, tending to turn the lever 90 counter-clockwise, or in the same direction as the force exerted on said lever by the empty brake cylinder push rod 82. The force developed by the load brake cylinder piston and transmitted through the lever 90, thus supplements the force exerted by the empty brake cylinder on the push rod 87 in applying the brakes on a car.

Fluid under pressure from pipe 75 is supplied through passage 130 to the chamber between the pistons 65 and 69 of the relay portion, so that when the load brake cylinder pressure has been increased to a point slightly greater than the opposing pressure in chamber 64, the piston 65 will be shifted so as to permit the poppet valve 72 to close and thus prevent further flow of fluid from the load reservoir to the load cylinder.

The pressure in the empty brake cylinder may be increased by effecting a further reduction in brake pipe pressure, and this results in a corresponding increase in pressure in the diaphragm chamber 62. The fulcrum bar 49 is consequently again operated to unseat the valve 76 so as to cause a corresponding or proportional increase in pressure in diaphragm chamber 127 and in the application piston chamber 64. The relay valve portion will then again operate to supply fluid under pressure to the load brake cylinder, so as to increase the load brake cylinder pressure to a degree corresponding to the increase in pressure in piston chamber 64. Thus the variable load device functions to graduate the pressure in the load brake cylinder to correspond with the graduations in pressure in the empty brake cylinder.

In releasing the brakes, when the empty brake cylinder 3 is connected to the atmosphere by operation of the triple valve device, as hereinbefore described, the pressure of the fluid in diaphragm chamber 62 decreases by the flow of fluid from said chamber through pipe 60 at the same rate as the pressure in the empty brake cylinder is decreased.

When the pressure in diaphragm chamber 62 is decreased in releasing the brakes, the then higher pressure in diaphragm chamber 127 acts through diaphragm 47 and stem 51 to cause the fulcrum bar 49 to be turned counter-clockwise about the roller 36 and thereby the adjusting screw 79 is caused to engage the stem of the release valve 80 and open said valve, so as to connect the application piston chamber 64 and diaphragm chamber 127 through passage 81 to the atmospheric passage 82.

Venting of fluid under pressure from the application piston chamber 64 causes the brake cylinder pressure, acting in the chamber between the pistons 65 and 69 to shift said pistons and the slide valve 67 to release position, as shown in the drawings, in which position passage 130 from the load brake cylinder 4, is connected to the atmosphere through passage 131, chambers 132, 133 and 66, exhaust ports 134, chamber 135 and atmospheric passage 136, thereby permitting fluid under pressure to be vented from the load brake cylinder to the atmosphere.

If the triple valve device 1 is so operated as to graduate the release of fluid from the empty brake cylinder, as hereinbefore described, the pressure in diaphragm chamber 62 will be reduced in corresponding steps. The pressure in the application piston chamber and in diaphragm chamber 127 will then be reduced in corresponding steps and proportional, according to the position of the roller 36 and the fulcrum bar 49. When the pressure in diaphragm chamber 127 becomes slightly less than the pressure in diaphragm chamber 62, the fulcrum bar 49 will operate to permit the release valve 80 to close, after which the load brake cylinder pressure will continue to reduce until slightly less than the pressure in the application piston chamber 64, when the pressure in said piston chamber will shift the application piston 65 and slide valve 66, so as to close communication between chambers 66 and 135, through passage 134, and thus prevent a further reduction in pressure in the load brake cylinder.

The load brake cylinder pressure can thus be reduced in steps proportional to the graduated release of fluid from the empty brake cylinder, as fluid is vented from the diaphragm chamber 62 with the release of fluid from the empty brake cylinder.

When the pressure of the fluid in the empty brake cylinder, pipe 60, and diaphragm chamber 62, has been reduced to a predetermined low degree, the pressure of spring 59 will operate to shift the valve piston 57 away from the gasket 63, so that said valve piston uncovers passage 125 and permits flow of fluid under pressure from passage 61 through passage 125 to chamber 52 and supplements the pressure of spring 59 to quickly shift the valve piston 57 to its seat against the seat ring 58, in which position fluid is vented from the diaphragm chamber 62, thereby always ensuring a complete release of fluid under pressure from said chamber.

If, for any reason, the release valve 80 should fail to open, so as to vent the fluid from the application piston chamber 64 in releasing the brakes, then when the empty brake cylinder pressure becomes slightly less than the pressure in the application piston chamber 64, the fluid under pressure in said piston chamber will flow back through passages 81 and 152, past the ball check valve 153 to passage 61 and thence to the empty brake cylinder 3 and to the atmosphere, thereby ensuring a release of fluid from the load brake cylinder.

If an emergency application of the brakes is effected by operation of the triple valve device 1, the high emergency pressure developed in the empty brake cylinder, being effective in diaphragm chamber 62 operates the valve 76 to produce a proportionately high pressure in the load brake cylinder, in the same manner as if a service application of the brakes had been made.

If, when the brake pipe is charged with fluid under pressure, it is desired to change the adjustment of the variable load device 2 for a change which may be made in the car load, the angle cock device 173, interposed in the pipe 104, is turned 90 degrees, or until the handle 175 is in the position shown in the dotted lines. In this position, the cavity 182 in the key 174 registers with pipe 183, connected through pipe 177 to valve chamber 166 of the regulating portion 156, while the cavity 176 in the key 174 registers with the atmospheric exhaust passage 184 in the cock casing 173. The fluid under pressure in the valve chamber 166 is thus vented to the atmosphere, which permits the spring 170 to shift the piston 165 and slide valve 167 to the inward position, as shown in the drawings, in which port 178 in the slide valve registers with passage 86. After the piston 165 and slide valve 167 have thus moved, the angle cock device is returned to the position shown in the drawings, in which fluid under pressure from the brake pipe 104 is again permitted to flow to the valve chamber 166 and through port 178 in the slide valve and pipe 86 to piston chambers 44 and 20 of the variable load device and cause a readjustment of the variable load device for the new load, in the same manner as hereinbefore described. When the pressure in the valve chamber 166, acting on piston 165, becomes sufficient to shift said piston against the pressure of spring 170, the piston and slide valve are shifted to the left, in which position pipe 86 is connected to the atmospheric exhaust port 181, through cavity 180 in the slide valve, said connection vents the fluid under pressure from the piston chambers 44 and 20 and causes the variable load device to be locked in the newly adjusted position.

The reservoir 168 connected to the valve chamber 166 serves only as an additional volume and increases the time required to build a pressure in the valve chamber sufficient to shift the piston 165 and slide valve 167 to the outward position.

Having now described my invention, what I claim as new and desire to secure by Letters Patent, is:—

1. In a fluid pressure brake, the combination with a brake cylinder and means for supplying fluid under pressure to said brake cylinder to apply the brakes, of a load brake cylinder, and means governed by the pressure developed in the first brake cylinder for supplying fluid under pressure to the load brake cylinder.

2. In a fluid pressure brake, the combination with a brake cylinder and means for supplying fluid under pressure to said brake cylinder to apply the brakes, of a load brake cylinder and means controlled by the pressure in the first brake cylinder and by the load on the car for supplying fluid under pressure to the load brake cylinder.

3. In a fluid pressure brake, the combination with a brake cylinder and means for supplying fluid under pressure to said brake cylinder to apply the brakes, of a load brake cylinder, and means controlled by the pressure in the first brake cylinder and by the load on the car for supplying fluid under pressure to the load brake cylinder in proportion to the load on the car and to the pressure developed in the first brake cylinder.

4. In a fluid pressure brake, the combination with a brake cylinder and means for supplying fluid under pressure to said brake cylinder to apply the brakes, of a load brake cylinder, a movable abutment subject to the pressure of fluid in the first brake cylinder, and means controlled according to the load on the car and according to the pressure on said abutment for controlling the supply of fluid under pressure to the load brake cylinder.

5. In a fluid pressure brake, the combination with a brake cylinder and means for supplying fluid under pressure to said brake cylinder to apply the brakes, of a load brake cylinder, and means controlled by the pressure of fluid supplied to the first brake cylinder and the load on the car for supplying fluid under pressure to the load brake cylinder, said means being ineffective to supply fluid to the load brake cylinder when the car is empty.

6. In a fluid pressure brake, the combination with a brake cylinder and means for supplying fluid under pressure to said brake cylinder to apply the brakes, of a load brake cylinder, a fulcrum lever, a fulcrum member for said lever, shiftable according to the load on the car, means subject to the pressure of fluid in the first brake cylinder for operating through said fulcrum lever to supply fluid to the load brake cylinder, said fulcrum member being shifted when the car is empty to a position in which said fulcrum lever is inoperative to effect the supply of fluid to the load brake cylinder.

7. In a fluid pressure brake, the combination with a brake cylinder and means for supplying fluid under pressure to said brake cylinder to apply the brakes, of a load brake cylinder, a fulcrum lever, a fulcrum member for said lever, means subject to the load on the car for adjusting the position of said fulcrum member, a movable abutment subject to the pressure of fluid in the first brake cylinder, a stem operated by said abutment for operating said lever, and means operated by said lever for supplying fluid under pressure to the load brake cylinder, said fulcrum member being moved to a position in line with the axis of said stem when the car is empty.

8. In a variable load brake apparatus, the combination with a brake pipe, of means adjustable according to the load on the car to provide a braking power proportional to the load on the car, and means operable as the brake pipe is charged with fluid under pressure for cutting said adjustable means into action.

9. In a variable load brake apparatus, the combination with a brake pipe, of means adjustable according to the load on the car to provide a braking power proportional to the load on the car, and means operable as the brake pipe is charged with fluid under pressure for first cutting said adjustable means into action and then cutting said means out of action.

10. In a variable load brake apparatus, the combination with a brake pipe, of means adjustable according to the load on the car to provide a braking power proportional to the load on the car, and means operable during the charging of the brake pipe with fluid under pressure for subjecting said adjustable means to the load on the car.

11. In a variable load brake apparatus, the combination with a brake pipe, of means adjustable according to the load on the car to provide a braking power proportional to the load on the car, and means operable during the charging of the brake pipe with fluid under pressure for first subjecting said adjustable means to the load on the car and for then preventing the load from acting on said adjustable means.

12. In a variable load brake apparatus, the combination with a brake pipe, of means adjustable according to the load on the car to provide a braking power proportional to the load on the car, controlling means for cutting said adjustable means into or out of operative relation with the load on the car, and a device operated upon an increase in brake pipe pressure for operating said controlling means to cut said adjustable means into operative relation with the load on the car.

13. In a variable load brake apparatus, the combination with a brake pipe, of means adjustable according to the load on the car, controlling means operated by fluid under pressure for cutting said adjustable means into operative relation with the load on the car, and valve means for supplying fluid under pressure to said controlling means as the brake pipe is charged with fluid under pressure, said valve means being operated after a predetermined time for venting fluid from said controlling means.

14. In a variable load brake apparatus, the combination with a brake pipe, of means adjustable according to the load on the car, controlling means operated by fluid under pressure for cutting said adjustable means into operative relation with the load on the car, and valve means operated upon a predetermined increase in brake pipe pressure for supplying fluid under pressure to said controlling means.

15. In a variable load brake apparatus, the combination with a brake pipe, of means adjustable according to the load on the car, controlling means operated by fluid under pressure for cutting said adjustable means into operative relation with the load on the car, valve means operated upon a predetermined increase in brake pipe pressure for supplying fluid under pressure to said controlling means, and a manually operated valve for controlling communication from the brake pipe to said valve means.

In testimony whereof I have hereunto set my hand.

UNCAS A. WHITAKER.